US012493255B2

(12) United States Patent
Koyama

(10) Patent No.: US 12,493,255 B2
(45) Date of Patent: Dec. 9, 2025

(54) FIXING DEVICE CAPABLE OF PREVENTING LUBRICANT FROM LEAKING FROM A FILM

(71) Applicant: CANON KABUSHIKI KAISHA, Tokyo (JP)

(72) Inventor: Fuyuko Koyama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/786,108

(22) Filed: Jul. 26, 2024

(65) Prior Publication Data

US 2025/0036056 A1 Jan. 30, 2025

(30) Foreign Application Priority Data

Jul. 27, 2023 (JP) ................................ 2023-122712

(51) Int. Cl.
*G03G 15/20* (2006.01)

(52) U.S. Cl.
CPC ..... *G03G 15/2053* (2013.01); *G03G 15/2064* (2013.01)

(58) Field of Classification Search
USPC .......................................................... 399/328
See application file for complete search history.

(56) References Cited

U.S. PATENT DOCUMENTS

| | | | | |
|---|---|---|---|---|
| 7,805,102 | B2 | 9/2010 | Kato | |
| 10,437,187 | B2 | 10/2019 | Hara et al. | |
| 2008/0187372 | A1 | 8/2008 | Kato | |
| 2019/0179243 | A1 | 6/2019 | Hara et al. | |
| 2022/0390883 | A1 * | 12/2022 | Sano | G03G 15/2053 |

FOREIGN PATENT DOCUMENTS

| | | | | |
|---|---|---|---|---|
| JP | 2008146964 | A | | 6/2008 |
| JP | 2011003654 | A | | 1/2011 |
| JP | 2015158597 | A | * | 9/2015 |
| JP | 2015166888 | A | | 9/2015 |
| JP | 2019101373 | A | | 6/2019 |
| JP | 2021189281 | A | | 12/2021 |

* cited by examiner

*Primary Examiner* — Quana Grainger
(74) *Attorney, Agent, or Firm* — Canon U.S.A., Inc. IP Division

(57) ABSTRACT

In a fixing device, when a nip portion forming member moves from a first position at time of fixing a toner image to a second position that is shifted from the first position in a first direction, a restriction unit is configured to restrict movement of a guide member in the first direction to change a relative position in the first direction between an inner surface of a film and an area of a nip portion forming member, the area facing the inner surface.

7 Claims, 16 Drawing Sheets

FIXING DEVICE CAPABLE OF PREVENTING LUBRICANT FROM LEAKING FROM A FILM

BACKGROUND

Field of the Disclosure

The present disclosure relates to a fixing device that is mounted on an image forming apparatus, such as a printer, using electrophotography to form a toner image on a recording material.

Description of the Related Art

Japanese Patent Application Laid-Open No. 2008-146964 discusses, as a fixing device mounted on an electrophotographic apparatus, a fixing device using a film heating method of nipping and conveying a recording material between a tubular film and a pressure roller. Japanese Patent Application Laid-Open No. 2008-146964 discusses, as the film heating method, a configuration in which a ceramic heater is disposed in an internal space of the film, and the film is sandwiched between the ceramic heater and the pressure roller. Other examples of configurations include a configuration in which a conductive layer is provided in a film and causes the film to emit heat by electromagnetic induction, and a configuration in which a power feeding terminal is brought into contact with a conductive layer of a film and power is fed to the film to cause the film to emit heat.

In the fixing device using the film heating method, an inner surface of the film and a nip portion forming member such as a ceramic heater slide with each other. For this reason, a lubricant, such as heat-resistant grease, is applied to the inner surface of the film.

Because the film has a tubular shape, there is a possibility that the lubricant leaks from an end portion of the film and flows around to an outer circumferential surface of the film. When the lubricant adheres to a recording material, there is a possibility that an image defect occurs.

Japanese Patent Application Laid-Open No. 2008-146964 discusses a configuration in which a film guide member, which is in contact with the inner surface of the film in a longitudinal direction of the film, is provided with a groove that guides the lubricant to the middle of the film in the longitudinal direction.

Even if ingenuity is exercised on the film guide member to prevent leakage of the lubricant, it is difficult to prevent leakage of the lubricant from the end portion of the film. The leakage of the lubricant from the end portion of the film mainly attributes to movement of the intervening lubricant in a contact area between the inner surface of the film and a nip forming member and in the vicinity of the contact area to the end portion due to a capillary phenomenon.

SUMMARY

Embodiments of the present disclosure are directed to provision of a fixing device capable of preventing leakage of a lubricant from an end portion of a film.

According to an aspect of the present disclosure, a fixing device configured to fix a toner image to a recording material includes a film having a tubular shape, a nip portion forming member in contact with an internal surface of the film in a longitudinal direction of the film, a roller that is in contact with an outer circumferential surface of the film and that forms a nip portion together with the nip portion forming member via the film, and a guide member that is disposed to face an internal surface of the film in an end portion area in the longitudinal direction and that is configured to guide rotation of the film, wherein the fixing device is configured to use the nip portion to fix the toner image to the recording material on which the toner image has been formed while nipping and conveying the recording material, wherein the fixing device further comprises a restriction unit configured to restrict movement of the guide member in a first direction that is perpendicular to the longitudinal direction and that is away from the roller, wherein the nip portion forming member is provided to be movable in the first direction, and wherein, when the nip portion forming member moves from a first position at time of fixing the toner image to a second position that is shifted from the first position in the first direction, the restriction unit is configured to restrict movement of the guide member in the first direction to change a relative position in the first direction between the inner surface of the film and an area of the nip portion forming member, the area facing the inner surface.

Further features of various embodiments will become apparent from the following description of exemplary embodiments with reference to the attached drawings.

DESCRIPTION OF THE EMBODIMENTS

Exemplary embodiments of the present disclosure will be described with reference to the drawings. Dimensions, materials, shapes, relative positions, and the like of components described in the exemplary embodiments should be changed as appropriate depending on a configuration of an apparatus to which the present disclosure is applied and various conditions, and are not intended to limit the scope of every embodiment to the following exemplary embodiments.

<Image Forming Apparatus>

Figure 1:
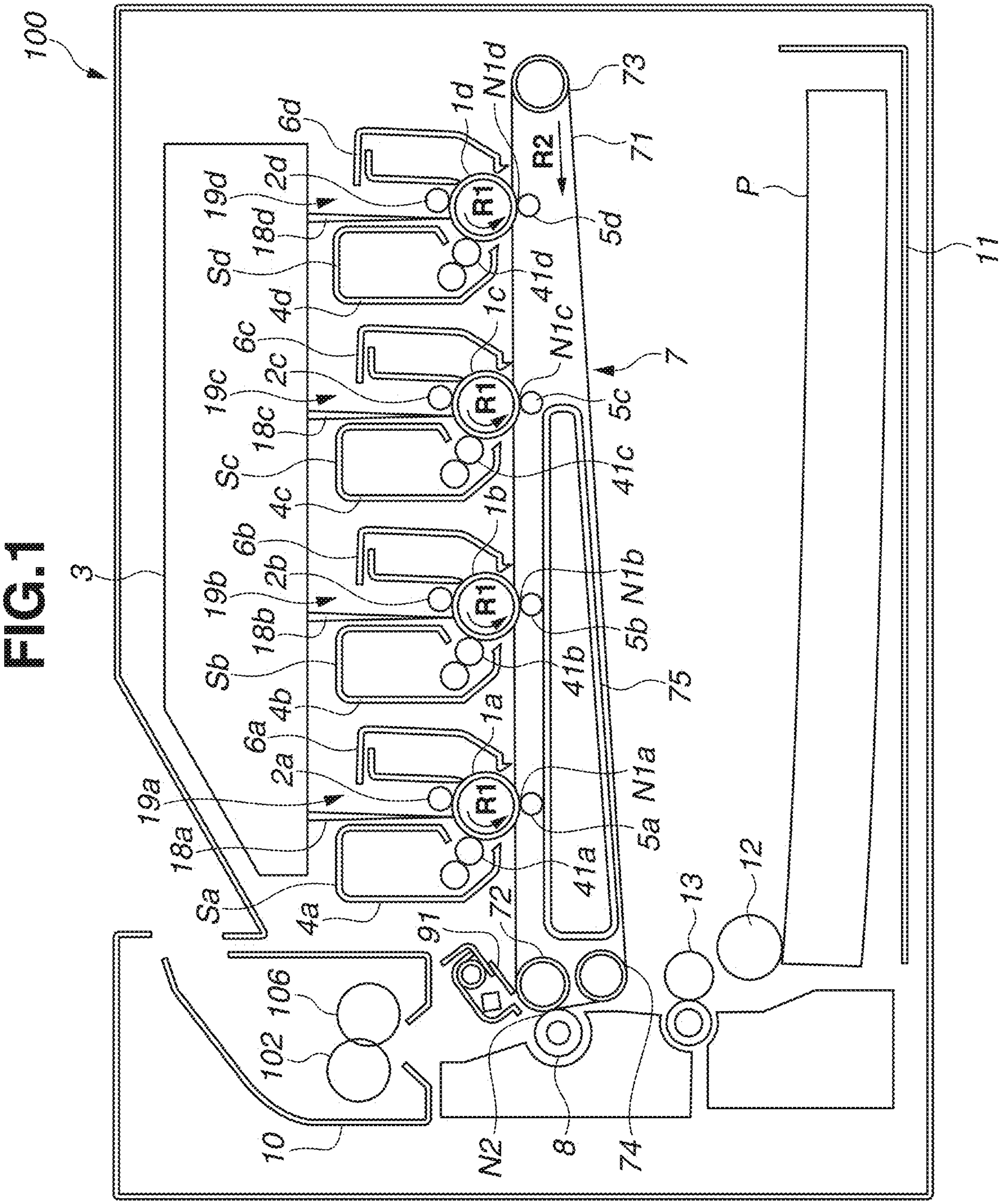
FIG. 1 is a cross-sectional view of an image forming apparatus.

A first exemplary embodiment is now described. FIG. 1 is a cross-sectional view schematically illustrating a configuration of an image forming apparatus 100. The image forming apparatus 100 according to the present exemplary embodiment is an electrophotographic image forming apparatus including a plurality of image forming units including a first image forming unit Sa, a second image forming unit Sb, a third image forming unit Sc, and a fourth image forming unit Sd. The first image forming unit Sa forms an image with yellow (Y) toner. The second image forming unit Sb forms an image with magenta (M) toner. The third image forming unit Sc forms an image with cyan (C) toner. The fourth image forming unit Sd forms an image with black (Bk) toner. These four image forming units are arranged in a row at regular intervals, and configurations thereof have substantially a lot in common excluding the colors of contained toner. Hence, in the following description, indexes of a, b, c, and d added to reference signs to indicate elements provided for corresponding colors are omitted and a description of these elements is collectively given.

An image forming unit S includes a photosensitive drum 1, a charging roller 2 that electrically charges the photosensitive drum 1, a developing unit 4, and a drum cleaning unit 6. In the present exemplary embodiment, the photosensitive drum 1, the charging roller 2, the developing unit 4, and the drum cleaning unit 6 are integrated into a cartridge and constitute a process cartridge 19 that is detachably mounted on the main body of the image forming apparatus 100.

The photosensitive drum 1 is rotationally driven in an R1 arrow direction at predetermined process speed. The developing unit 4 includes a developing roller 41 for supplying toner to the photosensitive drum 1. The drum cleaning unit 6 is a unit for collecting toner adheres to the photosensitive drum 1.

A scanner unit 3 emits laser light 18 corresponding to image information to the photosensitive drum 1 and scans the photosensitive drum 1 with the laser light 18. With this operation, an electrostatic latent image is formed on a surface of the photosensitive drum 1.

When an image forming operation is started in response to reception of an image signal by a control unit (not illustrated), the electrostatic latent image corresponding to the image information is formed on the photosensitive drum 1 of each image forming unit S by charging by the charging roller 2 and scanning by the scanner unit 3. Subsequently, the electrostatic latent image is developed by the developing roller 41, and a toner image is formed on the photosensitive drum 1.

The toner image formed on the photosensitive drum 1 in each image forming unit S is transferred to an intermediate transfer belt 71 that rotates in an R2 arrow direction at a position of a primary transfer unit N1. With this operation, toner images in four colors are superimposed upon one another on the intermediate transfer belt 71. The intermediate transfer belt 71 is supported in a tensioned state by three rollers of a driving roller 72, a tension roller 73, and a driven roller 74. The toner image formed on the photosensitive drum 1 is transferred to the intermediate transfer belt 71 with a voltage applied to a primary transfer roller 5. Toner, which has not been primarily transferred to the intermediate transfer belt 71 and remains on the photosensitive drums 1, is removed by the drum cleaning unit 6.

A recording material P accommodated in a paper feed cassette 11 is fed by a paper feed roller 12 and thereafter conveyed by a conveyance roller 13. In a secondary transfer unit N2, the toner image on the intermediate transfer belt 71 is transferred to the recording material P. The toner image on the intermediate transfer belt 71 is transferred to the recording material P with a voltage applied to a secondary transfer roller 8. A cleaner 9 cleans the intermediate transfer belt 71 and includes a cleaning member 91.

The recording material P on which the toner image has been transferred is conveyed to the fixing device 10 and subjected to fixing processing. The recording material P to which the toner image has been fixed is discharged to the outside of the image forming apparatus 100.

(Fixing Device)

A configuration of the fixing device 10 is now described. The fixing device 10 includes a tubular film 106 and a heater 109, which is a nip portion forming member in contact with an internal surface of the film 106 in a longitudinal direction of the film 106. The fixing device 10 further includes a pressure roller (roller) 102 that is in contact with an outer circumferential surface of the film 106 and that forms, together with the heater 109, a nip portion N with the film 106 interposed therebetween. The fixing device 10 further includes flanges 111R and 111L that are disposed so as to face an internal face of the film 106 at an end area in the longitudinal direction. Each of the flanges 111R and 111L includes a guide portion (guide member) 111*g* that guides the rotation of the film 106. The fixing device 10, using the nip portion N, fixes the toner image to the recording material P on which the toner image has been formed, while nipping and conveying the recording material P.

As described below, a unit including the heater 109, the guide member 107, a reinforcing stay 112, and support members 110R and 110L is referred to as a heater holder unit 119. A unit in which the film 106 and the flanges 111R and 111L are attached to the heater holder unit 119 is referred to as a film unit 101.

Figure 2:
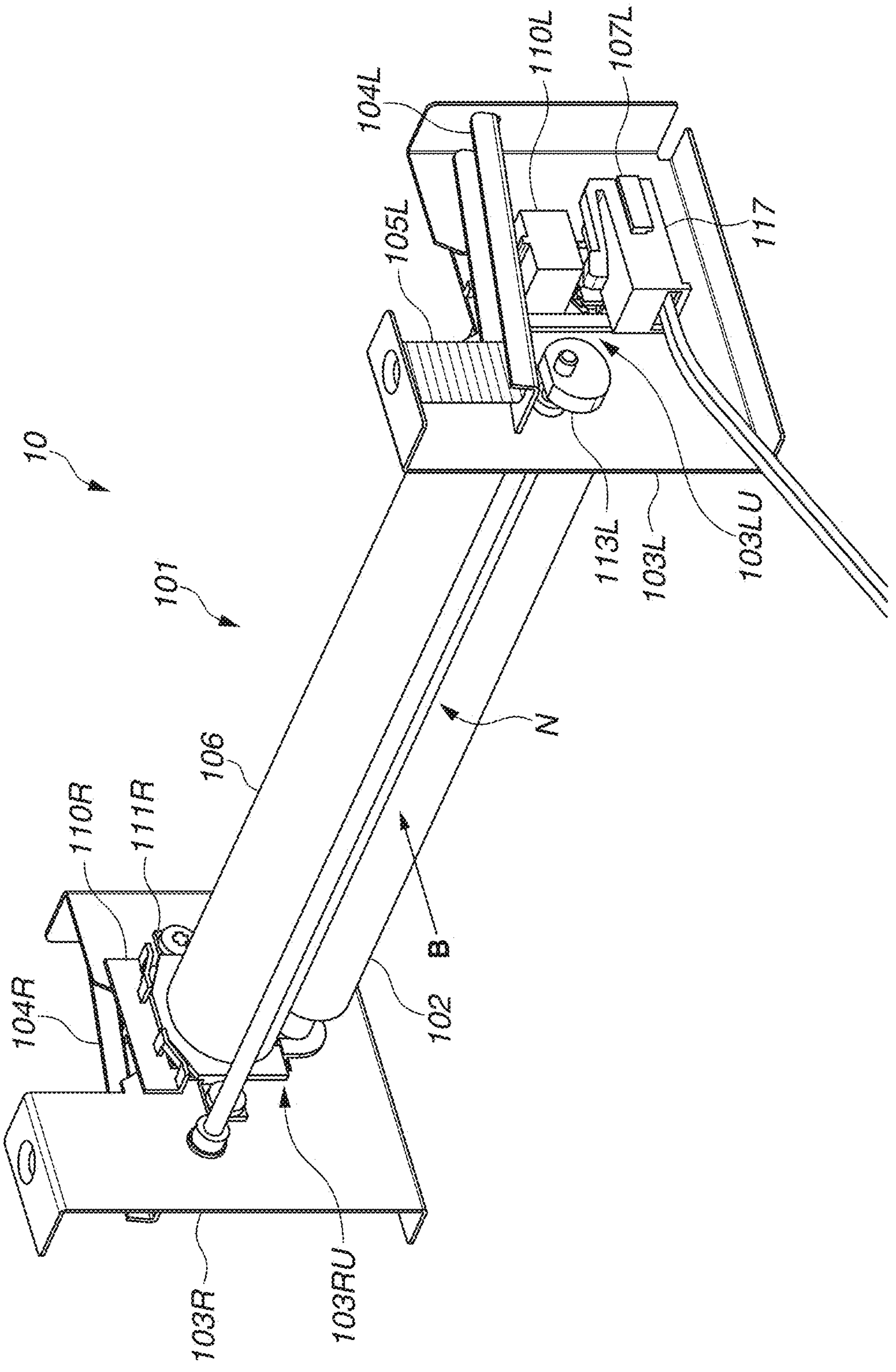
FIG. 2 is a perspective view of a fixing device according to a first exemplary embodiment.
Figure 3:
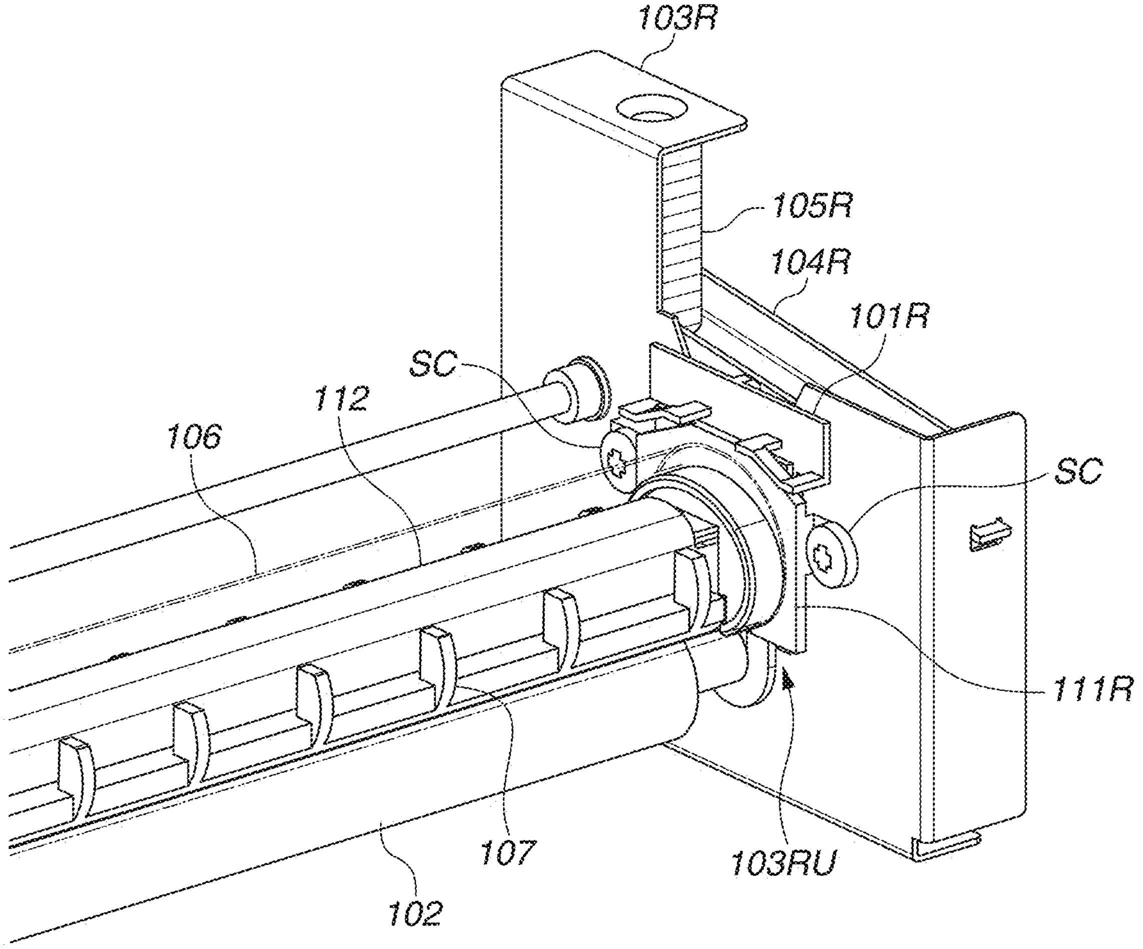
FIG. 3 is a perspective view of the fixing device according to the first exemplary embodiment.

FIG. 2 is a perspective view of the fixing device 10 when viewed from an upstream side of the recording material P in the conveyance direction. FIG. 3 is a perspective view in the vicinity of a side plate 103R, which is a portion of a frame of the fixing device 10. A pressure roller 102 includes a silicone rubber layer and a fluororesin layer that are provided around a core metal, and is rotatably attached to side plates 103L and 103R via respective bearings. The pressure roller 102 is rotated by driving force from a motor, which is not illustrated.

The film unit 101 is urged by compression springs 105L and 105R toward the pressure roller 102 via pressure plates 104L and 104R, respectively. The nip portion N is formed by urging force applied by the compression springs 105L and 105R. The recording material P is conveyed in a B direction illustrated in FIG. 2 and heated by heat from the heater 109 while being nipped between the film unit 101 and the pressure roller 102.

(Film Unit)

Figure 4:
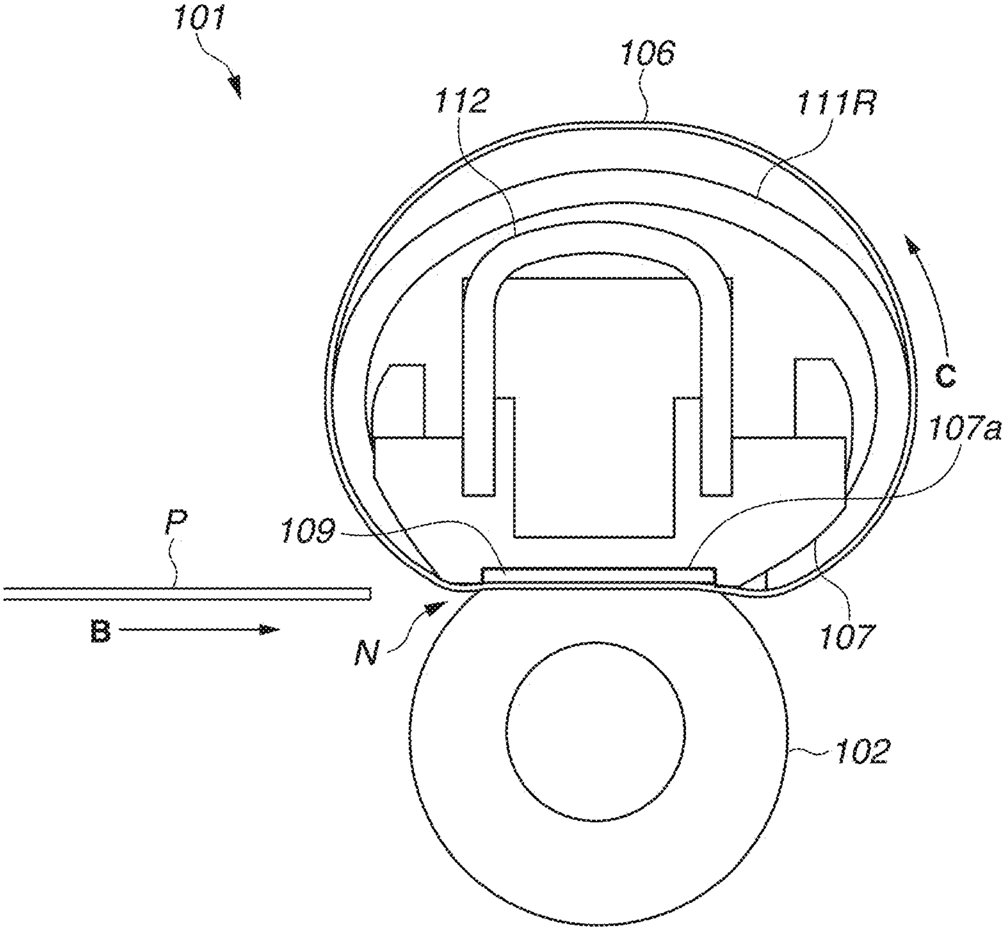
FIG. 4 is a cross-sectional view of the fixing device according to the first exemplary embodiment.

An internal configuration of the film unit 101 is now described with reference to FIGS. 3 to 6. FIG. 4 is a cross-sectional view of the fixing device 10 in the middle of the film 106 in the longitudinal direction (which may be hereinafter referred to as a film longitudinal direction or a pressure roller longitudinal direction), and is a view when viewed from the side plate 103L side to the side plate 103R side. Because a view when viewed from the side plate 103R to the side plate 103L is approximately identical, the illustration and description of the side plate 103L side will be omitted.

As described above, the film unit 101 includes the film 106, the flanges 111R and 111L, and the heater holder unit 119. Each of the flanges 111R and 111L includes the guide portion (guide member) 111*g* that guides the rotation of the film 106. The flanges 111R and 111L also have a function of restricting the movement of the film 106 in the film longitudinal direction.

The heater holder unit 119 includes the heater 109, a guide member 107, and a reinforcing stay 112. The guide member 107 is disposed in an internal space of the film 106 and rotatably supports the film 106. The reinforcing stay 112 is a metallic reinforcing member for reinforcing the guide member 107 and has a U-shape cross section. The heater 109 is held by the guide member 107.

The film 106 is a thin film tube having a thickness of about 30 to 100 μm and containing polyimide (PI) as a base layer, and is coated with fluororesin such as perfluoro alkoxy alkane (PFA) (a copolymer of tetrafluoroethylene and perfluoroalkyl vinyl ether) on the base layer via an adhesive layer. A material of each layer of the film 106 and a layer configuration of the film 106 are not limited to the above example. For example, the film 106 may include a rubber layer made of silicone rubber between the base layer and a fluororesin layer.

The heater 109 is a plate-like member that is long and thin in a direction perpendicular to the conveyance direction B of the recording material P, and in which a heat generating resistor is printed on a ceramic substrate. The heat generating resistor is covered with an insulation layer such as a glass layer. By supplying power to the heat generating resistor, the heat generating resistor generates heat.

As illustrated in FIG. 4, the heater 109 is accommodated in the middle of the guide member 107 in a B arrow direction. The nip portion N is formed by the heater 109 and the pressure roller 102 with the film 106 interposed therebetween. The pressure roller 102 is rotationally driven, whereby the film 106 is rotationally driven in a C arrow direction.

Heat-resistant grease as a lubricant is applied between the heater 109 and the film 106. The heat-resistant grease used in the fixing device 10 according to the present exemplary embodiment contains base oil that mainly provides a lubrication function and a thickening agent holding the base oil. The present exemplary embodiment uses, as the lubricant, HP-300 grease manufactured by Dow Toray Co., Ltd. using perfluoropolyether for the base oil and polytetrafluoroethylene (PTFE) for thickening agent.

Figure 5:
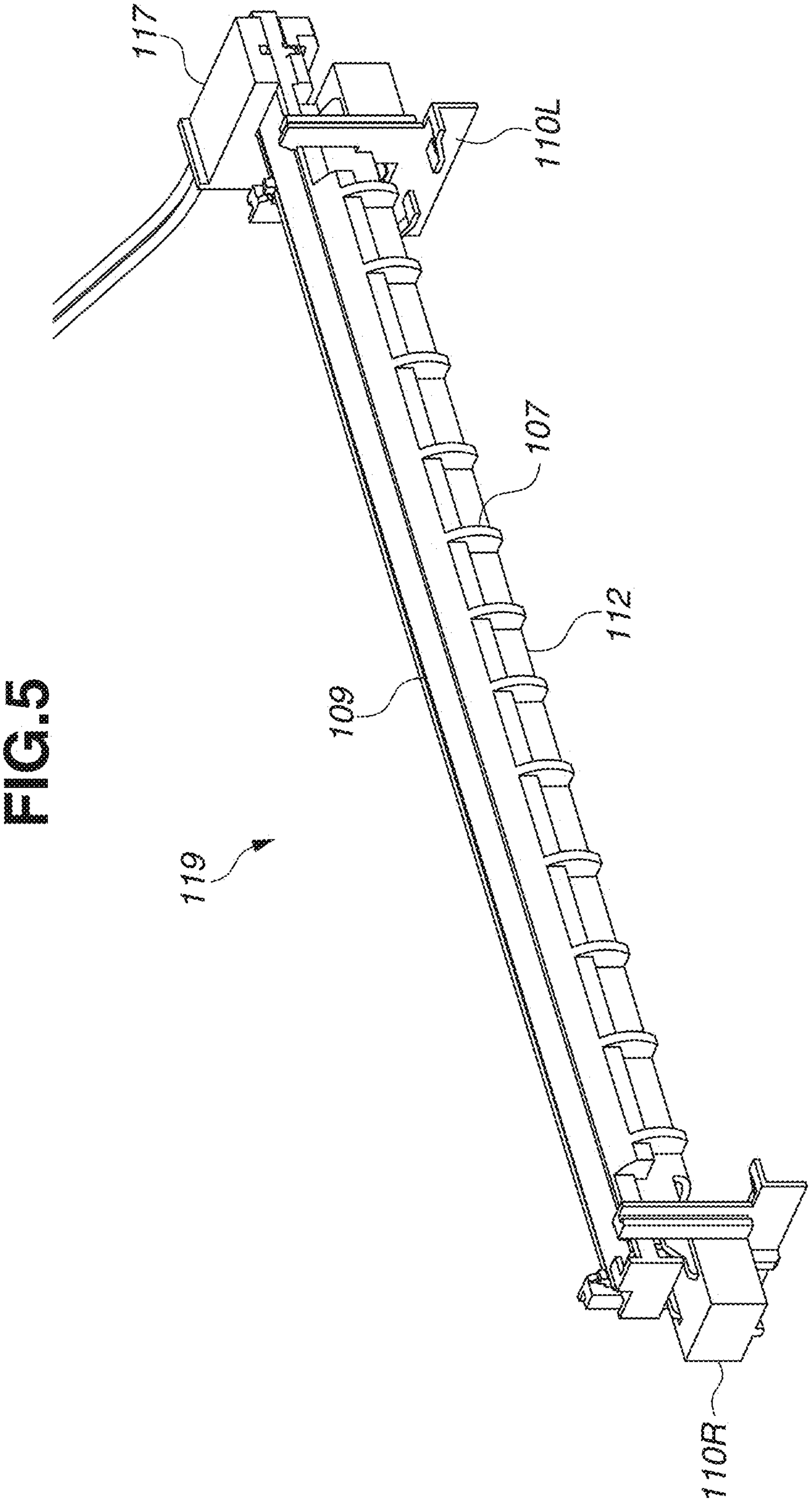
FIG. 5 is a perspective view of a heater holder unit according to the first exemplary embodiment.

FIG. 5 illustrates a configuration of the heater holder unit 119 excluding the film 106 and the flanges 111R and 111L at the respective ends from the film unit 101. As illustrated in FIG. 5, the guide member 107 is a member that extends in the internal space of the film 106 in the film longitudinal direction, and a recess portion 107*a* (refer to FIG. 4) that accommodates the heater 109 is provided across the whole area in the longitudinal direction. The guide member 107 is formed of resin such as heat-resistant liquid crystal polymer resin, polyphenylene sulfide (PPS) resin, and polyetheretherketone (PEEK) resin. One end portion in the longitudinal direction of the heater 109, which is accommodated in the recess portion 107*a* in the guide member 107, is fitted to a pressing portion provided in the guide member 107, and a power supply connector 117 is attached to the other end portion of the heater 109, whereby the heater 109 is fixed to the guide member 107.

Figure 6:
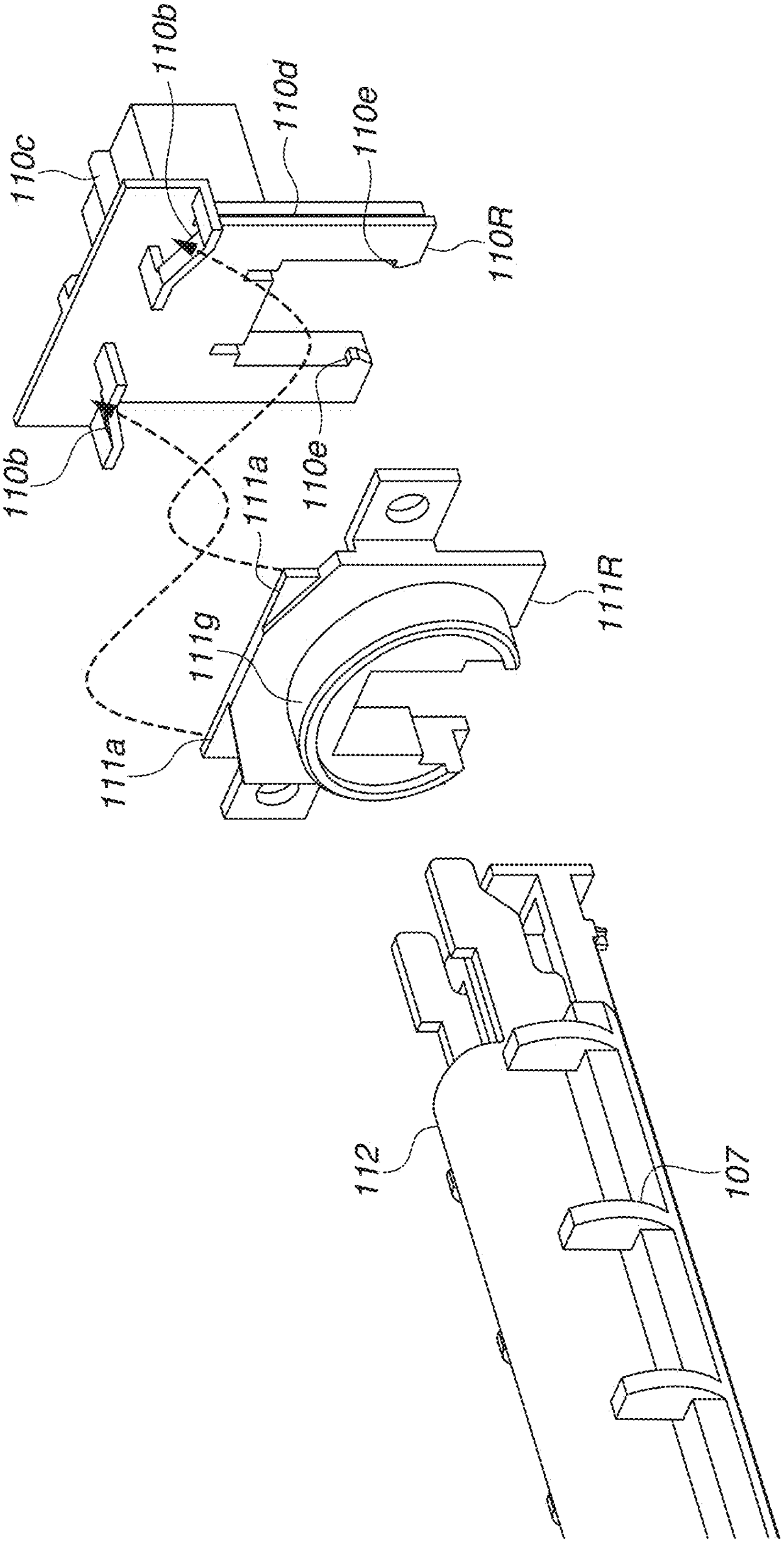
FIG. 6 is a perspective view of the heater holder unit according to the first exemplary embodiment.

FIG. 6 is a conceptual view illustrating a state before the flange 111R and the support member 110R are attached to the guide member 107. As illustrated in FIG. 6, the support member 110R to be attached to the end portion of the guide member 107 is provided with claw portions 110*e*. The support member 110R is attached to the end portion of the guide member 107 and the end portion of the reinforcing stay 112 (the end portion of the guide member 107 in the longitudinal direction) so as to put the end portion of the guide member 107 and the end portion of the reinforcing stay 112 deep into the support member 110R. Similarly, the support member 110L is attached to the end portion of the guide member 107 and the end portion of the reinforcing stay 112 so as to put the end portion of the guide member 107 and the end portion of the reinforcing stay 112 deep into the support member 110L.

A process of attaching the flanges 111R and 111L to the heater holder unit 119 is now described.

As illustrated in FIG. 6, ear portions 111*a* of the FIG. 111R are inserted into respective flange temporary holding portions (through-holes) 110*b* provided in the support member 110R. The support member 110R is fit in the guide member 107 and the reinforcing stay 112, and the film 106 is attached so that the end portion of the film 106 is hooked on the guide portion 111*g* of the flange 111R. Thereafter, the support member 110L and the flange 111L on the opposite surface are also attached similarly to the above-mentioned manner.

Grooves 110*d* for inserting the support member 110R into the side plate 103R are provided on respective sides of the support member 110R. The same applies to the support member 110L. As illustrated in FIGS. 2 and 3, the film unit 101 is mounted on the side plates 103R and 103L to which the pressure roller 102 is attached. The pressure roller 102 is attached to U-shaped grooves 103RU and 103LU respectively provided in the side plates 103R and 103L. The grooves 110*d* in the support member 110R are fit in an edge of the side plate 103R forming the U-shaped groove 103RU in the side plate 103R, whereby the film unit 101 is mounted on the side plate 103R. The same applies to the side plate 103L side.

In a state where the heater holder unit 119 is pressured toward the pressure roller 102 and the nip portion N (the nip portion to be used at the time of fixing processing), the flange 111R is fixed to the side plate 103R with screws SC. The same applies to the flange 111L side. Thus, the screws SC correspond to a restriction unit that restricts movement of the guide portion 111*g* in a first direction that is perpendicular to the longitudinal direction and that is away from the pressure roller 102.

Figure 9A:
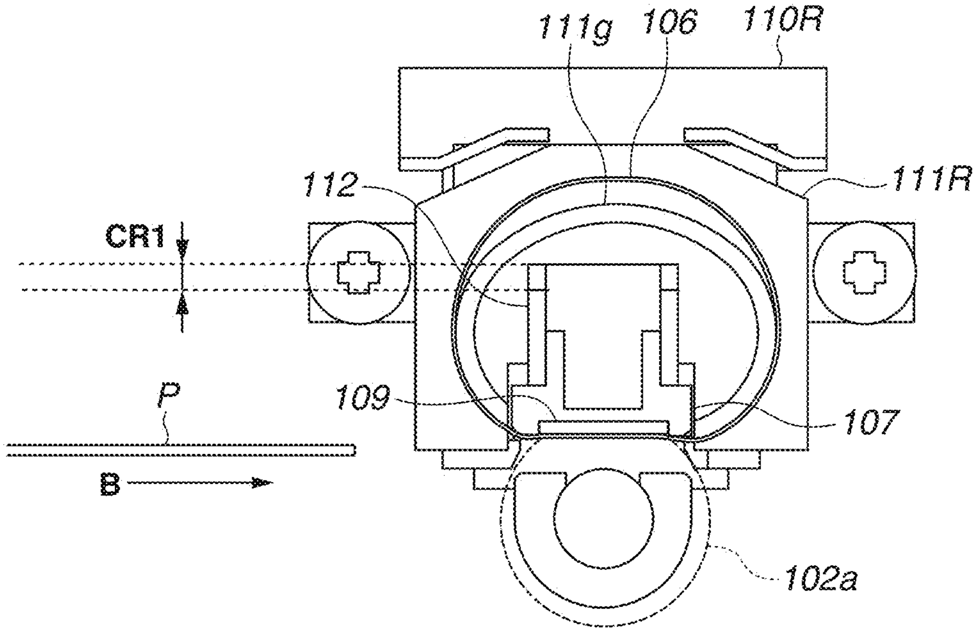
FIGS. 9A and 9B are cross-sectional views for describing an operation of the fixing device according to the first exemplary embodiment.

At this time, a predetermined clearance CR1 (refer to FIG. 9A) is provided between each of the flanges 111R and 111L and each member of the heater holder unit 119 in the pressure direction of the pressure roller 102. In FIG. 9A, a clearance between the flange 111R and the reinforcing stay 112 is the clearance CR1. Hence, even though the flanges 111R and 111L are respectively fixed to the side plates 103R and 103L, the heater holder unit 119 is still movable within a range of the clearance CR1.

Figure 7A:
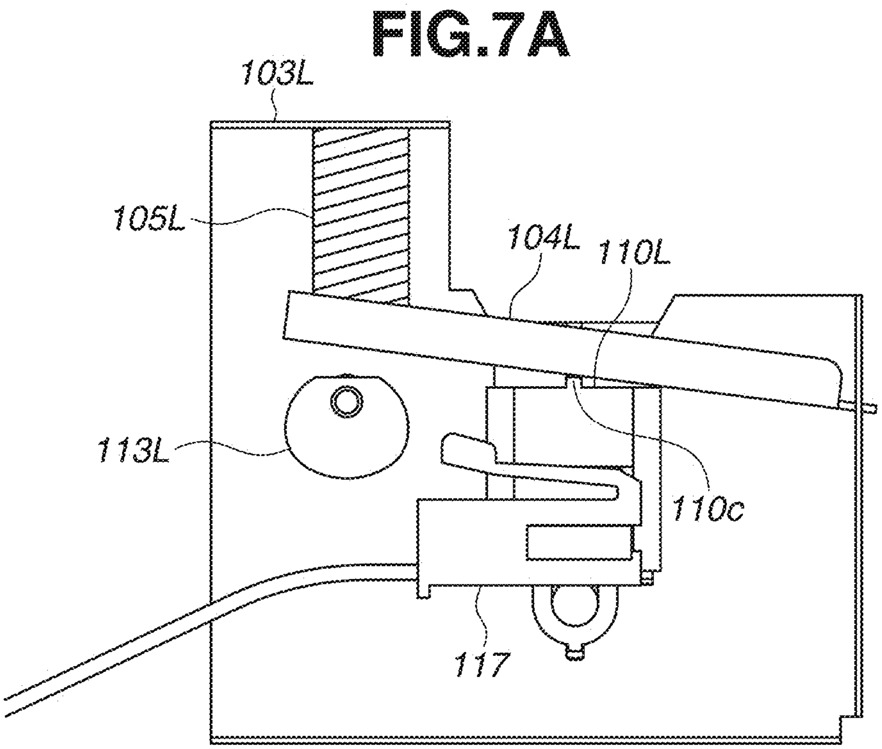
FIGS. 7A and 7B are side views each illustrating a pressuring operation of the fixing device according to the first exemplary embodiment.
Figure 7B:
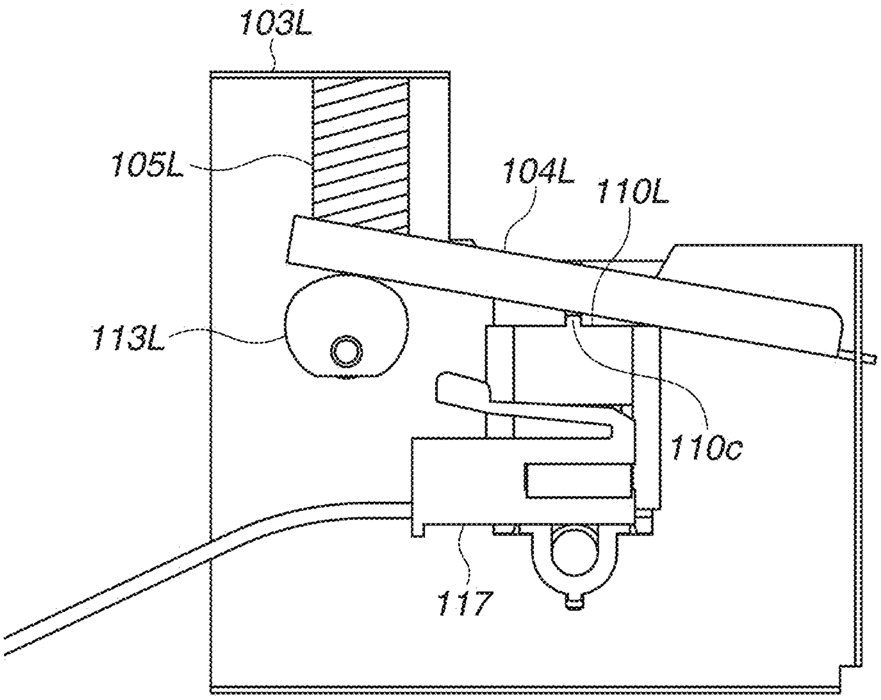

A pressuring configuration of the fixing device 10 is now described. FIGS. 7A and 7B are side views of the fixing device 10 when viewed from the side plate 103L side. FIG. 7A illustrates a state where pressure is applied. FIG. 7B illustrates a state where application of pressure is released. As illustrated in FIGS. 6 and 7A, one end of a pressure plate 104L is inserted into a hole provided in the side plate 103L and thereby supported, and the other end of the pressure plate 104L is pressed by the compression spring 105L, whereby an upper surface portion 110*c* of the support member 110L is pressed toward the pressure roller 102 side. Pressing force applied to the support member 110L is transmitted to the reinforcing stay 112 and the guide member 107 illustrated in FIGS. 4 to 6, and the heater 109 is pressed toward the pressure roller 102 side. The same applies to the flange 111R side. The support members 110L and 110R are pressed toward the pressure roller 102 side, whereby the whole of the heater holder unit 119 is pressed toward the pressure roller 102.

At this time, because the flanges 111R and 111L are respectively fixed to the side plates 103R and 103L in a state with the clearance CR1 interposed between each of the flanges 111R and 111L and the heater holder unit 119, pressing force of the compression springs 105R and 105L is not applied to the flanges 111R and 111L. In contrast, as illustrated in FIG. 7B, when the pressure plate 104L is lifted by a cam 113L and the application of pressure is released, the support member 110L to which the force of pressure has been applied by the pressure plate 104L is released from the restriction put by the pressure plate 104L. That is, the pressure applied by the heater holder unit 119 to the pressure roller 102 is released. In the present exemplary embodiment, the application of pressure to the pressure roller 102 is released at the time of jam processing or power-OFF.

As described above, the lubricant is applied between the heater 109 and the film 106. The lubricant is crucial to maintain favorable lubricity of the heater 109 and the film 106. However, since the film 106 has the tubular shape, there is a possibility that the lubricant applied to the inner surface of the film 106 leaks from the end portion and flows around to the outer circumferential surface of the film 106. Especially in a case where the film 106 has not rotated for a long period of time in the state of forming the nip portion N after the execution of the fixing processing on the toner image, there is a possibility that the lubricant that has flowed around to the outer circumferential surface of the film 106 reaches the nip portion N and spreads along the longitudinal direction of the nip portion N. In a case where printing is performed in such a state, there is a possibility that the lubricant adheres to the recording material P, causing an image defect. The lubricant leaks from the end portion of the film 106, whereby the grease on the inner surface of the film 106 also gradually decreases. In consideration of the decrease of the lubricant in the long term, it is possible to consider increasing an amount of application of the lubricant in an initial phase of use of the image forming apparatus 100. However, the application of the lubricant beyond necessity increases a risk for outflow of the lubricant from the end portion of the film 106.

In the present exemplary embodiment, the inner surface of the film 106 in the film longitudinal direction and the heater 109 are actively separated from each other, whereby the lubricant is prevented from spreading to an end surface of the film 106 due to the capillary phenomenon caused by the contact between the inner surface of the film 106 and the heater 109.

(Film Separation Mechanism)

Figure 8A:
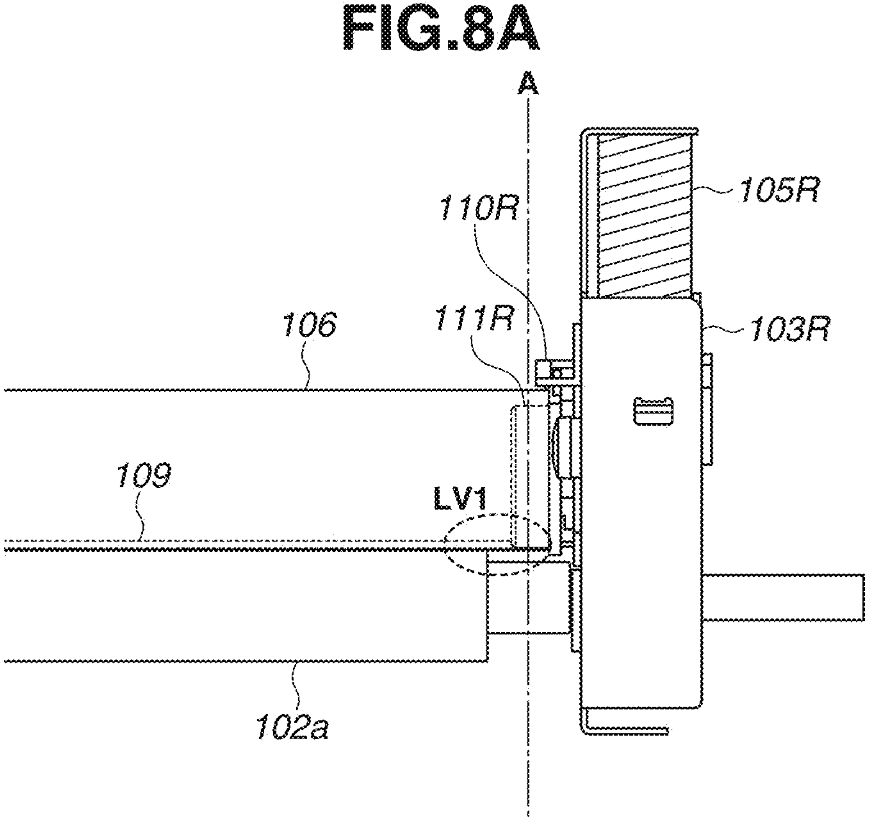
FIGS. 8A and 8B are side views of the fixing device according to the first exemplary embodiment.
Figure 8B:
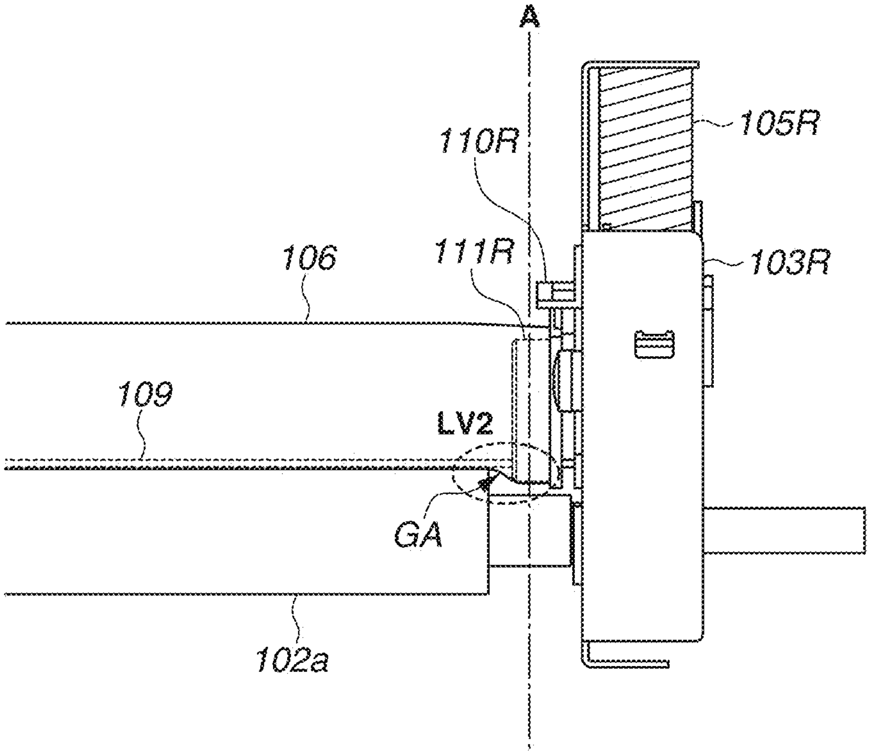

A film separation mechanism and an operation thereof are now described. FIGS. 8A and 8B are views illustrating part of the side plate 103R side of the fixing device 10 when viewed from the downstream side of the recording material P in the conveyance direction, and illustrating a positional relationship of components in the film longitudinal direction. FIG. 8A is a view when pressure is applied. FIG. 8B is a view when the application of pressure is released.

Figure 9B:
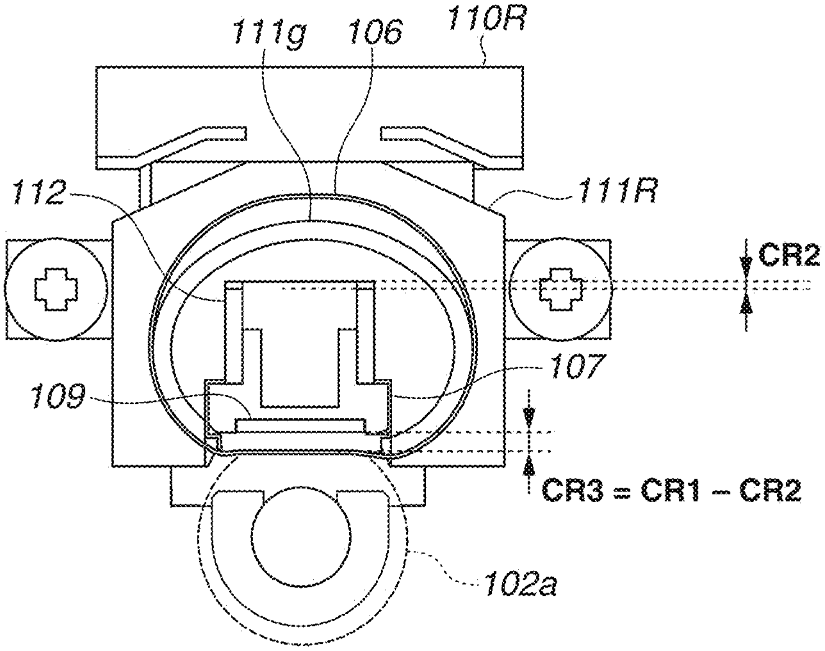

As illustrated in FIG. 8A, the overall length of the film 106 is longer than that of a rubber portion 102*a* of the pressure roller 102, and the flange 111R that supports the film 106 is located outside the rubber portion 102*a* of the pressure roller 102 in the film longitudinal direction. FIG. 9A is a cross-sectional view along an alternate long and short dash line A illustrated in FIG. 8A. FIG. 9B is a cross-sectional view along an alternate long and short dash line A illustrated in FIG. 8B. FIGS. 9A and 9B are cross-sectional views when viewed from the middle of the pressure roller 102 in the roller longitudinal direction toward a direction of the end portion. Because the rubber portion 102*a* of the pressure roller 102 does not exist in the cross-sectional views in FIGS. 9A and 9B, FIGS. 9A and 9B each illustrate a broken line that projects an outer shape of the rubber portion 102*a* of the pressure roller 102.

As illustrated in FIGS. 8A and 9A, the rubber portion 102*a* of the pressure roller 102 is crushed by being pressed in a pressured state, and the nip portion N is formed between the rubber portion 102*a* and the heater 109 with the film 106 interposed therebetween. A contour of the guide portion 111*g* of the flange 111R is designed so that the film 106 smoothly rotates at the time of application of pressure (at the time of the fixing processing). Thus, as illustrated in an area LV1 in FIG. 8A, in the film 106, an area sandwiched by the pressure roller 102 and the heater 109 and an area not sandwiched by the pressure roller 102 and the heater 109 are approximately identical. That is, in the film 106 in the film longitudinal direction, the area not sandwiched by the pressure roller 102 and the heater 109 is also in contact with the heater 109. Especially, in a case where the state illustrated in FIG. 8A occurs when the film 106 does not rotate, the lubricant easily leaks out from the end portion of the film 106 due to the capillary phenomenon.

In contrast, when the application of pressure is released as illustrated in FIGS. 8B and 9B, the pressing by the pressure plate 104R is released. As a result, an elastic layer of the rubber portion 102*a* that has been crushed by being pressed in the pressure roller 102 returns from a deformed state to an original state. The heater holder unit 119 that has been pressed toward the pressure roller 102 side is pressed by the rubber portion 102*a*, and moves in an opposite direction of the pressure direction. With the movement, the portion of the film 106 pressed by the pressure roller 102 also moves.

In contrast, because the flange 111R is fixed to the side plate 103R with the screws SC, the position of the flange 111R is not changed even in a case where the application of pressure is released. Thus, the end portion of the film 106 whose inner surface is supported by the guide portion 111*g* of the flange 111R is restricted by the guide portion 111*g* of the flange 111R and maintains its position that is approximately unchanged from that when pressure is applied. The state of the film 106 at this time is illustrated in FIG. 8B and FIG. 9B. As illustrated in an area LV2 in FIG. 8B, the film 106 is deformed and a space GA is generated between the film 106 and the heater 109.

As illustrated in FIG. 9B, the position of the end portion of the film 106 on the pressure roller 102 side is restricted by the guide portion 111*g* of the fixed flange 111R, while the heater 109 is integrated with the heater holder unit 119 as part of the heater holder unit 119 by the release of the application of pressure, and moves in the opposite direction of the pressure direction. A clearance CR2 at this time is smaller than the clearance CR1. The same applies to the flange 111L side. The inner surface of the film 106 at the end portion, which is restricted by the guide portion 111*g* of the flange 111R, is separated from a facing sliding surface of the heater 109.

As for a clearance CR3 between the heater 109 and the inner surface of the film 106, a relation of CR3=CR1−CR2 holds.

In the present exemplary embodiment, the separation of the inner surface of the film 106 from the heater 109 is in conjunction with the release of the application of pressure and is performed at the time of jam processing, power-OFF, or the like, but a timing of the release of the application of pressure is not limited to these timings. At a timing when sheet supply of the recording material P is not performed, it is possible to separate the inner surface of the film 106 from the heater 109 by releasing the application of pressure at a freely selected timing.

In the present exemplary embodiment, the inner surface of the film 106 and the heater 109 are separated from each other when the sheet supply is not performed, whereby it is possible to prevent the lubricant from leaking from the end portion of the film 106 to the outer circumferential surface due to the capillary phenomenon caused by the contact between the inner surface of the film 106 and the heater 109.

The fixing device 10 according to the first exemplary embodiment includes the screws SC that restrict the movement of the guide portion 111*g* in the first direction that is perpendicular to the longitudinal direction and that is away from the pressure roller 102. The heater 109, which is the nip portion forming member, is provided to be movable in the first direction. When the heater 109 moves from a first position of fixing the toner image to a second position that is shifted from the first position in the first direction, the screws SC restrict the movement of the guide portion 111*g* in the first direction. With this configuration, a relative position in the first direction between the inner surface of the film 106 and the area of the heater 109 facing the inner surface of the film 106 changes. The fixing device 10 includes the side plates 103R and 103L, which are part of the frame holding the pressure roller 102 and the guide portion 111*g*. The screws SC fix the guide portion 111*g* to the side plates 103R and 103L to restrict the movement of the guide portion 111*g*.

The fixing device 10 according to the present exemplary embodiment includes the heater 109 in the internal space of the film 106, and has the configuration in which the heater 109 and the pressure roller 102 form the nip portion N with the film 106 interposed therebetween. The material of the substrate for the heater 109 is not limited to ceramic, and may be, for example, metal.

A device that sandwiches the film 106 with the pressure roller 102 is not limited to the heater 109, and the film separation mechanism according to the present exemplary embodiment can be applied to a simple plate-like device without a heat-generating function. Examples of the device include a fixing device in which a film itself generates heat, a fixing device including a heat generating source on a pressure roller side, and a fixing device in which a heater disposed in an internal space of a film does not contribute to formation of a nip portion.

A second exemplary embodiment is now described with reference to FIGS. 10 to 15. A fixing device according to the present exemplary embodiment is different from that according to the first exemplary embodiment mainly in a configuration of a film unit and the presence/absence of the pressure release unit, but a basic configuration regarding fixing of a recording material is similar. Thus, a description of a configuration that is common to that of the first exemplary embodiment is omitted.

Figure 10:
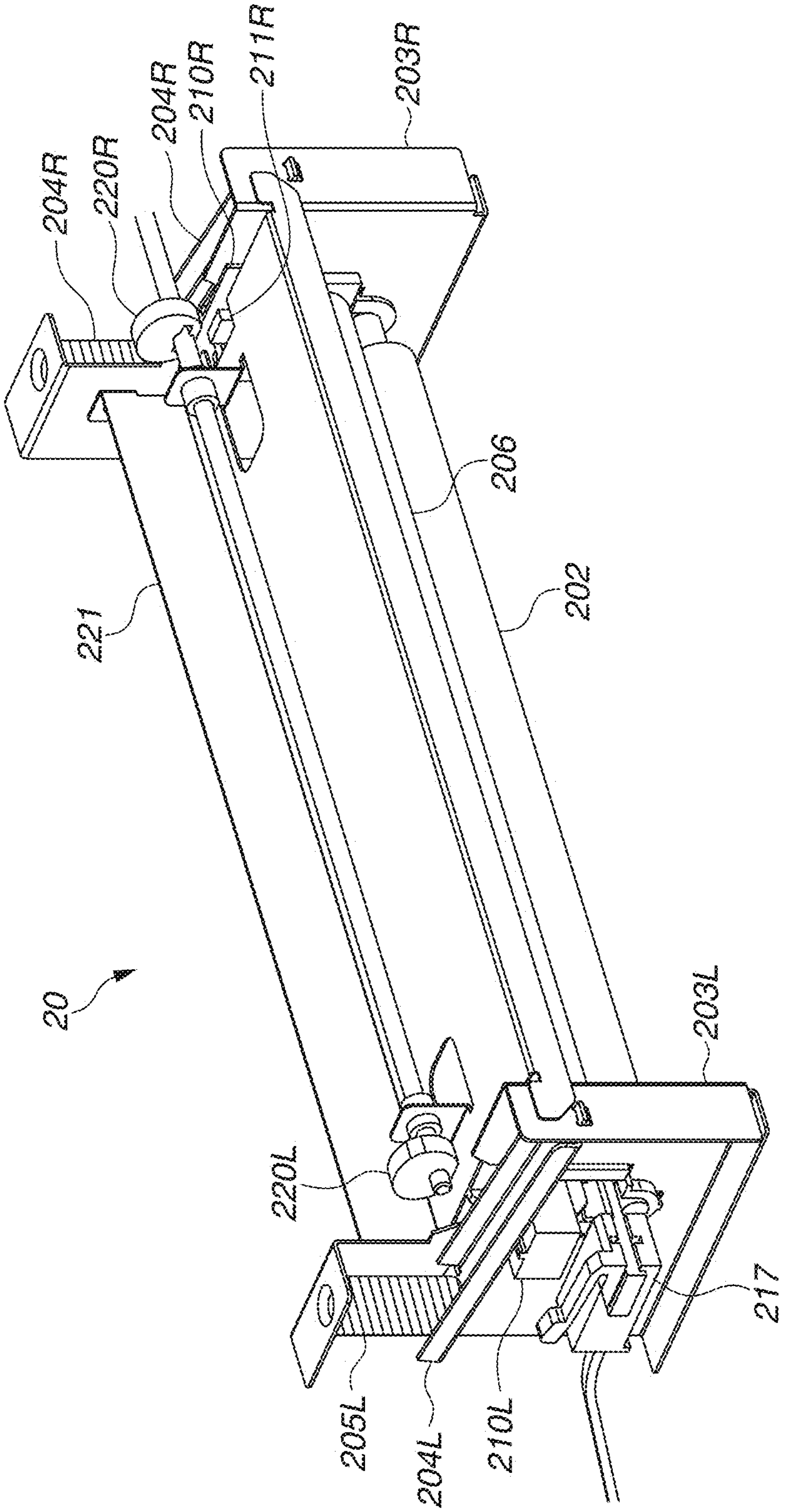
FIG. 10 is a perspective view of a fixing device according to a second exemplary embodiment.

FIG. 10 is a perspective view of a fixing device 20 according to the second exemplary embodiment. The fixing device 20 is largely different from the fixing device 10 in that a flange 211R that supports an end portion of a film 206 from an inner surface is movable in a pressure direction of a pressure roller 202, and includes a flange depressing cam 220R that depresses the flange 211R. The shape of the flange 211R will be described below.

The flange depressing cam 220R is attached to a shaft that is rotatably attached to a top board (not illustrated) provided to connect a side plate 203L on the left side and a side plate 203R on the right side. The flange depressing cam 220R moves pivotally with driving force from a driving source, which is not illustrated. Unlike the fixing device 10, the fixing device 20 includes no pressure release unit for a pressure plate 204, and a heater holder unit 219 is constantly pressed toward a pressure roller 202.

Figure 11:
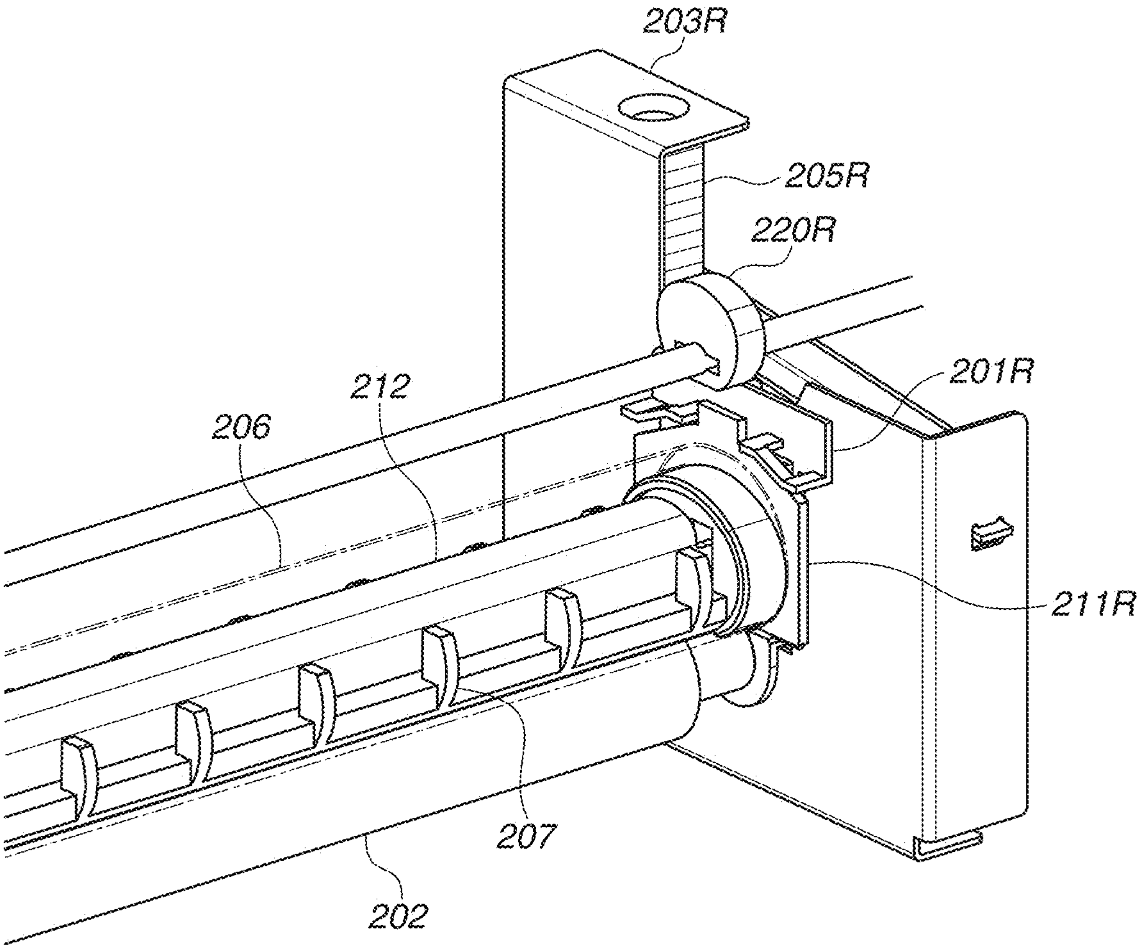
FIG. 11 is a perspective view of the fixing device according to the second exemplary embodiment.
Figure 12A:
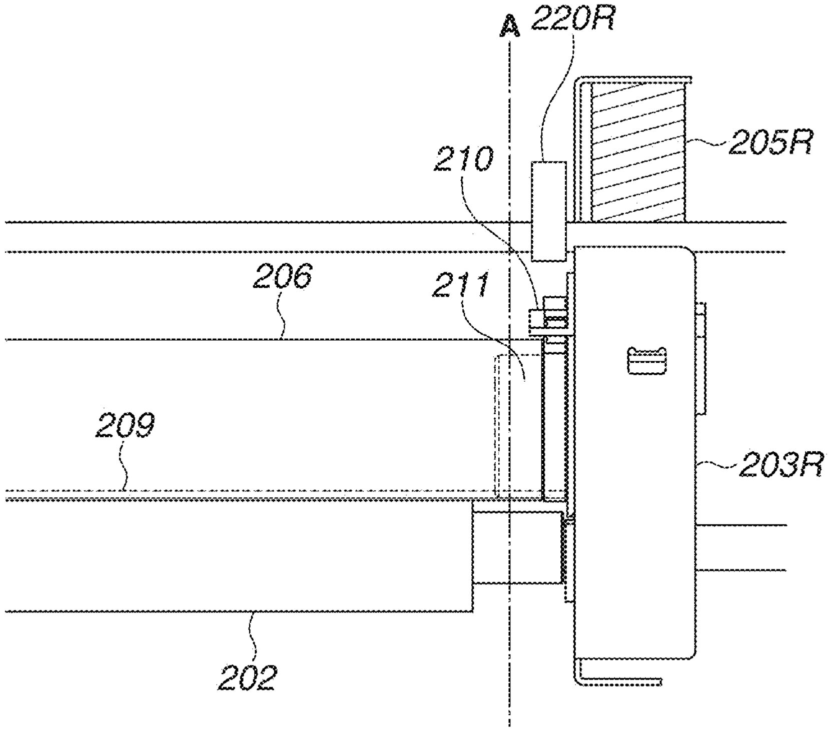
FIGS. 12A and 12B are side views of the fixing device according to the second exemplary embodiment.
Figure 12B:
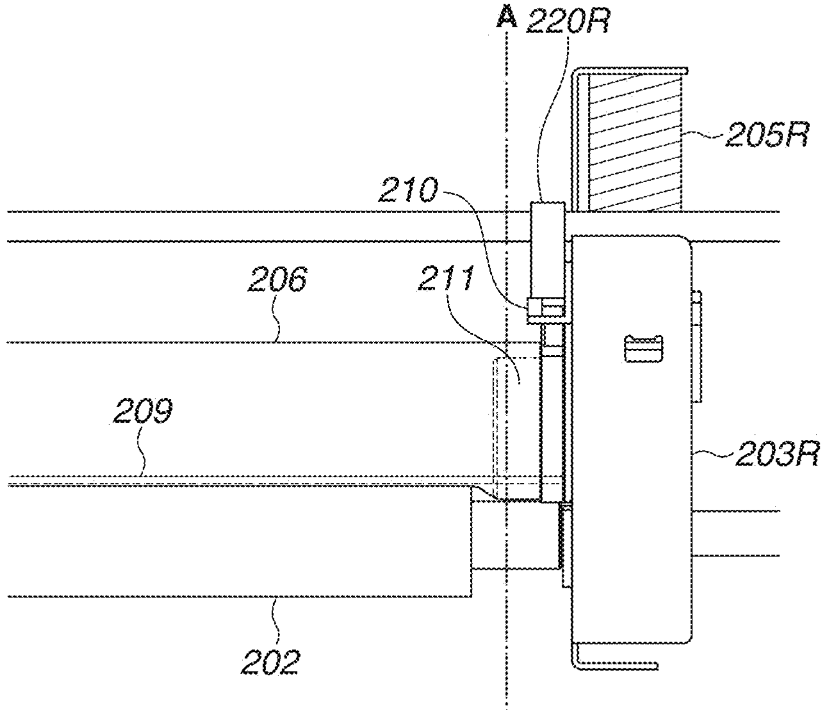
Figure 13A:
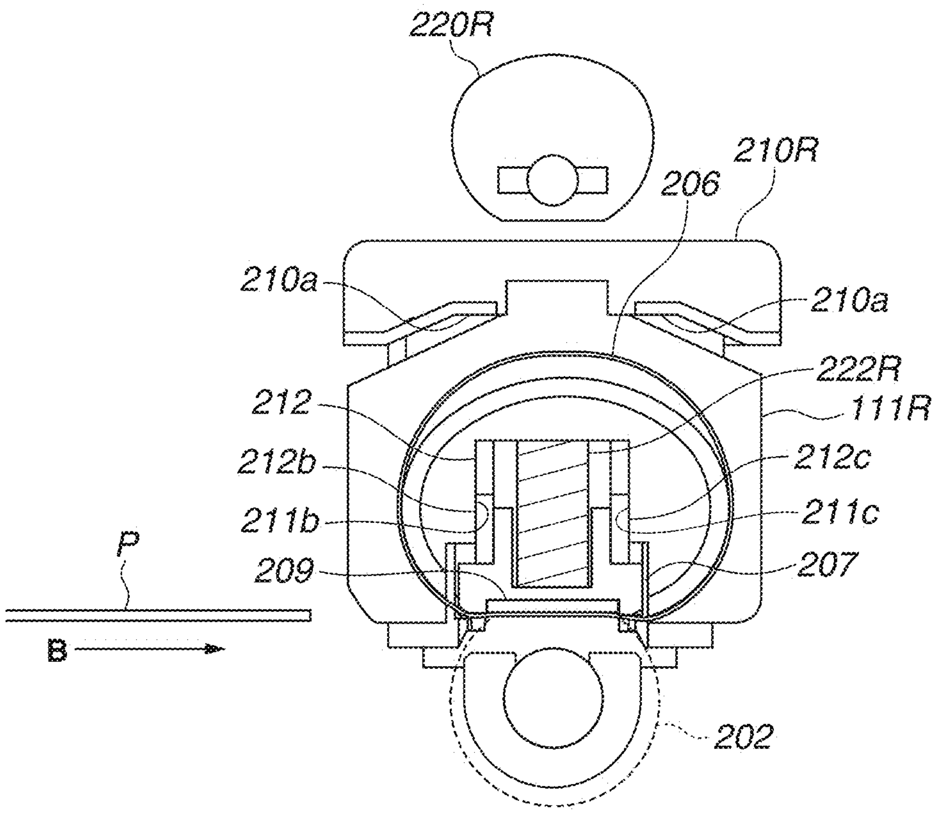
FIGS. 13A and 13B are cross-sectional views for describing an operation of the fixing device according to the second exemplary embodiment.
Figure 13B:
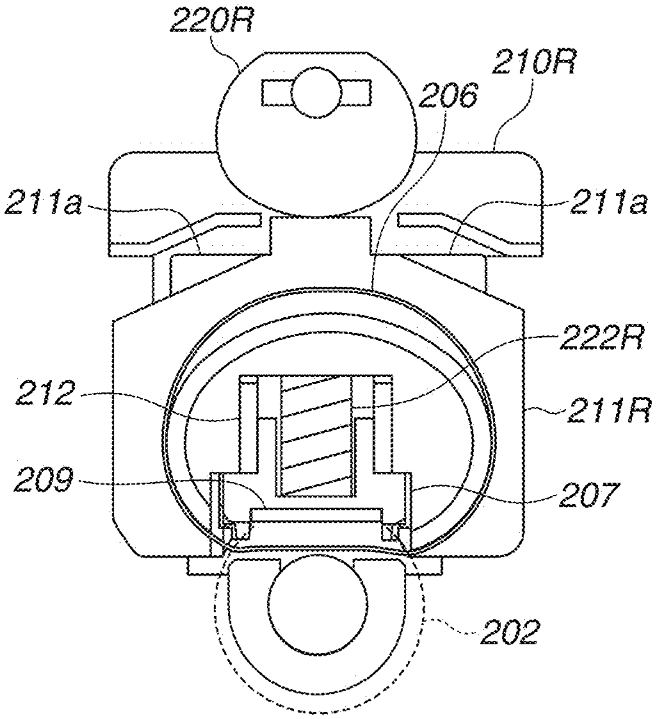

FIG. 11 is a perspective view illustrating the film 206 with an alternate long and short dash line. FIGS. 12A and 12B are views illustrating part of a side plate 203R side of the fixing device 20 when viewed from the downstream side of the recording material P in the conveyance direction, and illustrating a positional relationship in the longitudinal direction between the pressure roller 202 and each component. FIG. 12A illustrates a state at the time of normal rotation (at the time of fixing processing). FIG. 12B illustrates a state where a flange 211R is depressed by the flange depressing cam 220R when the sheet supply is not performed. FIG. 13A is a cross-sectional view along an alternate long and short dash line A illustrated in FIG. 12A. FIG. 13B is a cross-sectional view along an alternate long and short dash line A illustrated in FIG. 12B. FIGS. 13A and 13B are cross-sectional views when viewed from the middle of the pressure roller 202 in the longitudinal direction toward a direction of the end portion.

The flanges 111R and 11L in the fixing device 10 according to the first exemplary embodiment are positioned with respect to the side plates 103R and 103L, respectively, by being fixed to the side plates 103R and 103L, respectively, with the screws SC. A flange 211R according to the present exemplary embodiment is, as illustrated in FIG. 13A, pressed toward a support member 210R by a compression spring 222R installed between a guide member 207 (having a shape similar to that of the guide member 107 described in the first exemplary embodiment) and the flange 211R at the time of normal rotation (at the time of fixing processing). With this configuration, butting portions 211*a* butt against respective restriction portions 210*a* of the support member 210R, whereby a position of the flange 211R in a butting direction is determined.

In contrast, a position of the flange 211R in the conveyance direction of the recording material P (the B arrow direction) is determined by fitting of side surfaces 211*b* and 211*c* to side surfaces 212*b* and 212*c* of a reinforcing stay 212. The flange 211R moves along the side surfaces 212*b* and 212*c* of the reinforcing stay 212 in conjunction with the flange depressing cam 220R. Each of the flanges 211R and 211L moves along the reinforcing stay 212 in the present exemplary embodiment, but is only required to be movable toward the pressure roller 202 side, and the configuration is not limited to the above-described example. For example, each of the flanges 211R and 211L may be movable along a rail or the like provided on the guide member 207.

In a case where the flange depressing cam 220R rotates when the sheet supply is not performed, as illustrated in FIGS. 12B and 13B, the flange 211R is depressed toward the pressure roller 202 side while compressing the compression spring 222R. The flange 211R that supports the film 206 from the inner surface depresses the end portion of the film 206 in the longitudinal direction as illustrated in FIGS. 12B and 13B. Because the position of the heater holder unit 219 is not changed at this time, it is possible to separate the inner circumferential surface of the film 206 and the heater 209 from each other. The same applies to the flange 211L side.

Needless to say, a clearance is preliminarily provided in the pressing direction so that the flange 211R can be moved toward the pressure roller 202 side by a predetermined amount and the flange 211R and the heater holder unit 219 do not interfere with each other when the flange 211R is pressed. In the present configuration, when the flange depressing cam 220R depresses the flange 211R, pressing force applied to the compression spring 222R is applied to the pressure roller 202 via the guide member 207 and the heater 209. Hence, in order to infallibly separate the film 206 and the heater 209 from each other, an amount of deformation of the pressure roller 202 by the pressing force applied by the flange depressing cam 220R needs to be smaller than an amount of movement of the inner surface of the film 206 at the end portion in the longitudinal direction by the depression of the flange 211R. A spring constant of the compression spring 222R needs to be selected so as to satisfy such a relationship. The amount of deformation of the pressure roller 202 by the pressing force applied by the flange depressing cam 220R corresponds to an amount of movement of the heater 209 in contact with the pressure roller 202 with the film 206 interposed therebetween. An amount of depression of the flange 211R is set to be about 1 to 3 mm. To prevent bleeding of oil due to the capillary phenomenon, the film 206 and the heater 209 are only required to be separated from each other and need not be separated from each other beyond necessity. With such a small amount of separation, even in a case where the film 206 is deformed in the longitudinal direction, there is no damage caused on the film 206 due to an excessive load.

In the second exemplary embodiment, the flanges 211R and 211L that support the film 206 from the inner surface are respectively depressed by the flange depressing cams 220R and 220L, whereby the film 206 and the heater 209 can be separated from each other. In the first exemplary embodiment, it is not possible to ensure separation between the film 106 and the heater 109 in an amount more than or equal to an amount of restoration of the rubber portion 102*a* of the pressure roller 102 from the deformation state with the release of the application of pressure. In contrast, in the present exemplary embodiment, the amount of movement of the flanges 211R and 211L, that is, the amount of depression of the flange depressing cams 220R and 220L is set, whereby the amount of separation between the film 206 and the heater 209 can be adjusted.

Accordingly, it is possible to ensure a larger amount of separation, and facilitate separation of the inner surface of the film 206 at the end portion in the longitudinal direction from the heater 209.

Figure 14:
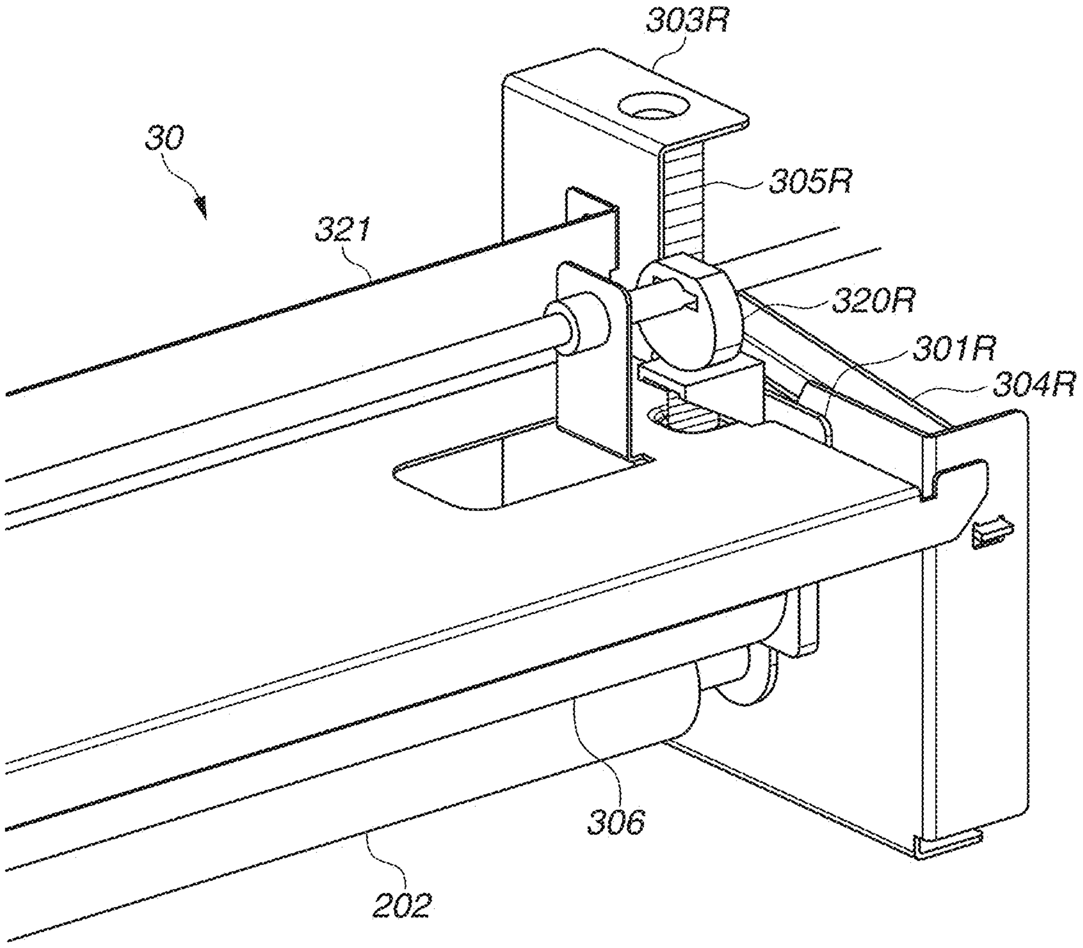
FIG. 14 is a perspective view for describing an operation of a fixing device according to a third exemplary embodiment.
Figure 15:
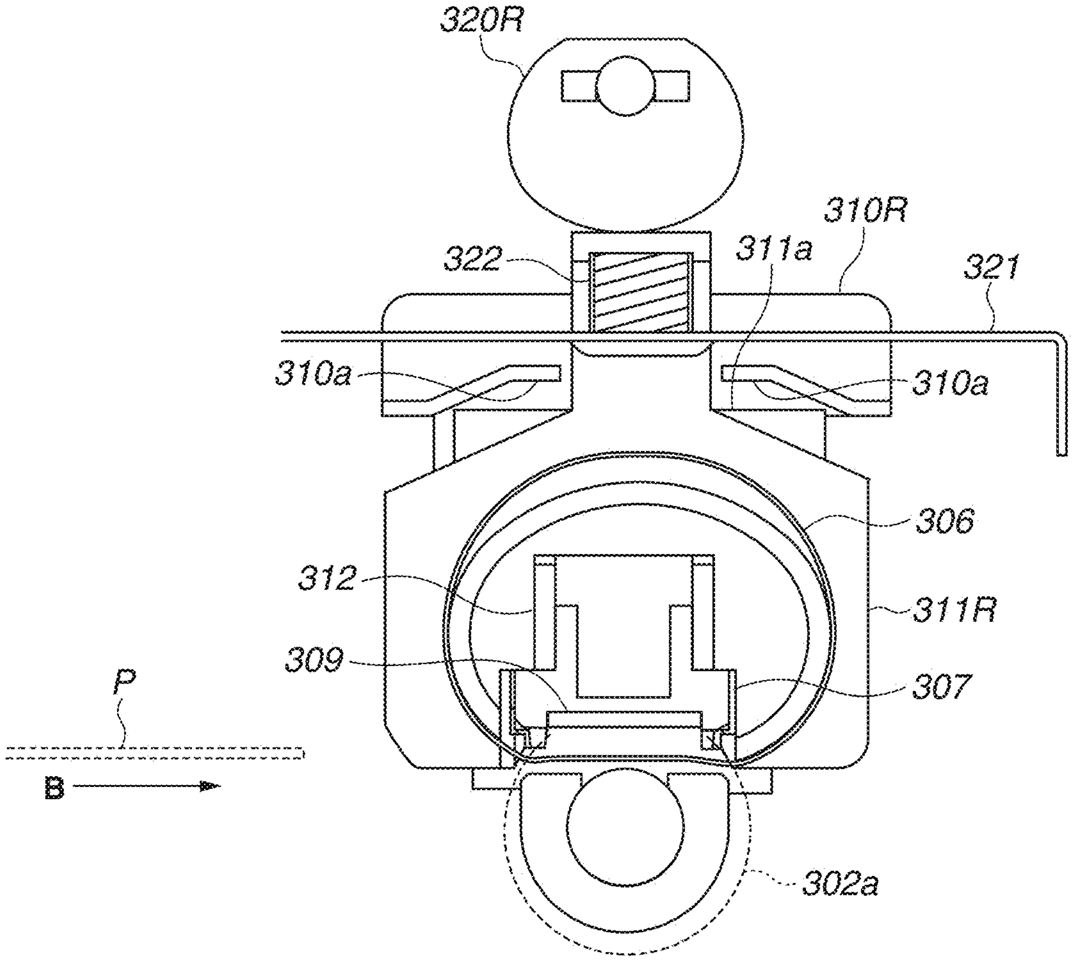
FIG. 15 is a cross-sectional view of the fixing device according to the third exemplary embodiment.

A third exemplary embodiment is now described. A basic configuration of a fixing device 30 according to the present exemplary embodiment is similar to those according to the first and second exemplary embodiments, and a description of a common configuration is omitted. FIG. 14 is a perspective view of the fixing device 30. FIG. 15 is a view illustrating a state where a depressing cam depresses a flange similarly to the second exemplary embodiment. The fixing device 30 is different from the fixing device 20 in that a position of a compression spring that presses the flange toward a support member and a shape of the flange, and the other configuration is similar.

As illustrated in FIG. 15, unlike the second exemplary embodiment, a compression spring 322 is provided between a top board 321 and each of flanges 311R and 311L, not between each of the flanges 311R and 311L and a guide member 307. With this configuration, pressing force of the compression spring 322 is applied to the top board 321 when each of the flanges 311R and 311L is depressed by a depressing cam 320. Hence, it is possible to separate a film 306 from a heater 309 without applying a load to a heater unit and a pressure roller 302 via the compression spring 322. Accordingly, it is possible to select a spring constant of the compression spring 322 without any concern for deformation of the pressure roller 302.

The positions of the flanges 311R and 311L in a pressure direction are determined by respective butting portions 311*a* of the flanges 311R and 311L butting against respective restriction portions 310*a* of support members 310R and 310L, similarly to the second exemplary embodiment. In the present exemplary embodiment, as described above, it is possible to strengthen the compression spring 322 without any concern for application of a load to the pressure roller 302 or deformation of the pressure roller 302. Hence, it is possible to increase force of butting each of the flanges 311R and 311L against the restriction portion 310*a*, and further stabilize the position of each of the flanges 311R and 311L. However, it is necessary to make pressing force of the compression spring 322 applied to each of the flanges 311R and 311L sufficiently smaller than the pressing force of the compression spring 305 so as not to affect nip pressure between the heater 309 and the pressure roller 302 at the time of fixing. A position of each of the flanges 311R and 311L in the conveyance direction of the recording material P (the B arrow direction) is determined by fitting of side surfaces 311*b* and 311*c* to side surfaces of a reinforcing stay 312, similarly to the second exemplary embodiment. Each of the flanges 311R and 311L moves along the side surfaces of the reinforcing stay 212 in conjunction with the depressing cam 320.

Figure 16:
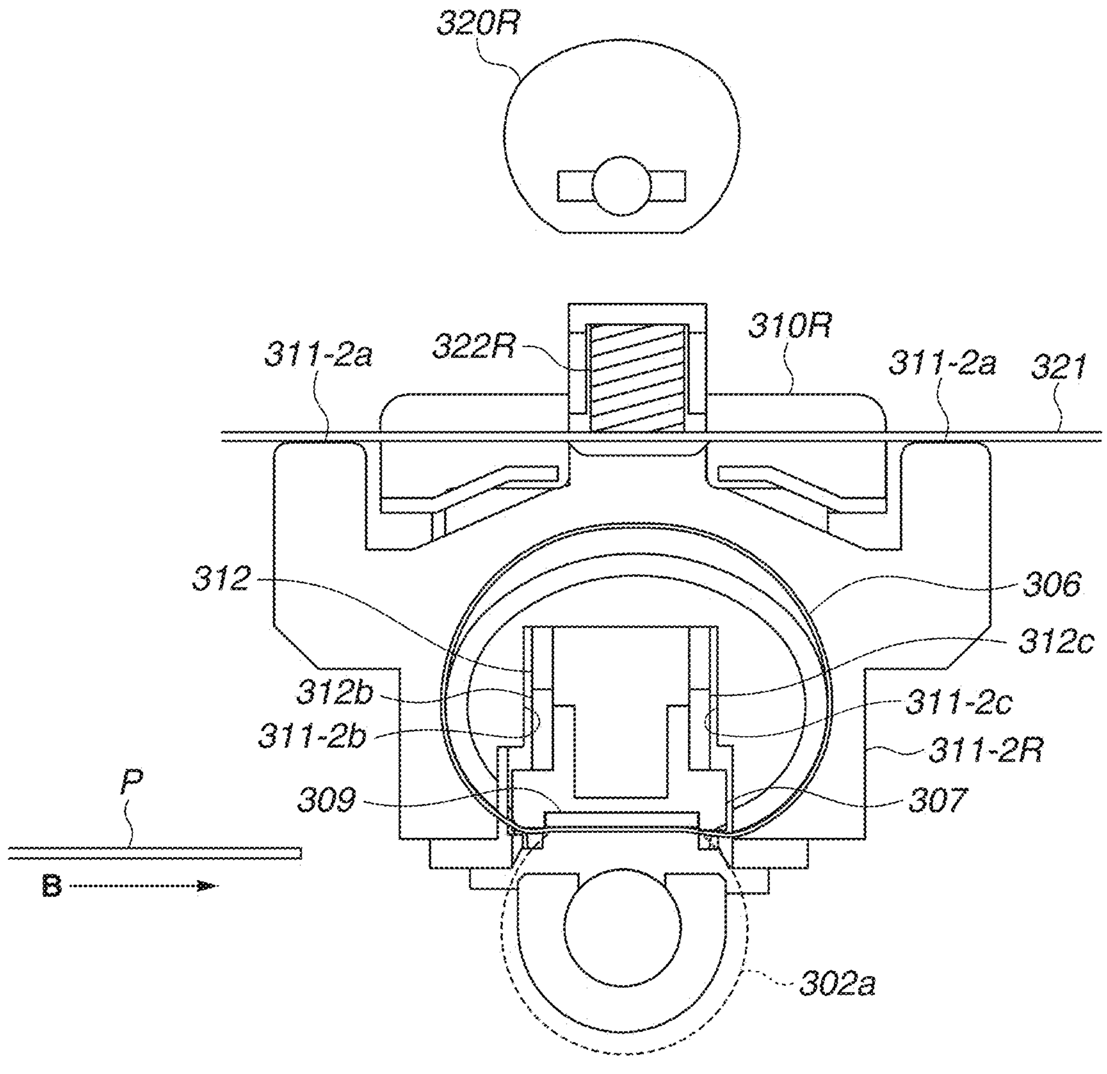
FIG. 16 is a cross-sectional view of the fixing device according to the third exemplary embodiment.

As another configuration of the present exemplary embodiment, a configuration illustrated in FIG. 16 can be adopted. The configuration according to the present exemplary embodiment and the configuration illustrated in FIG. 16 are different in ideas of the shape and positioning of a flange. The position of a flange 311-2R in a pressure direction illustrated in FIG. 16 is determined not by a support member 310R but by a butting portion 311-2*a* butting against the top board 321. The same applies to a flange 311-2L side. The position of each of the flanges 211R and 211L according to the second exemplary embodiment and the position of each of the flanges 311R and 311L according to the third exemplary embodiment in the conveyance direction of the recording material P are respectively determined by each of the flanges 211R and 211L and each of the flanges 311R and 311L fitting to the side surfaces of the reinforcing stays 212 and 312, as described above. In contrast, a clearance is provided between a side surface 311-2*b* of each of the flanges 311-2R and 311-2L and a side surface 312*b* of the reinforcing stay 312 and between a side surfaces 311-2*c* of each of the flanges 311-2R and 311-2L and a side surface 312*c* of the reinforcing stay 312. With this configuration, each of the flanges 311R and 311L is capable of moving, with respect to a heater holder unit 319, by an amount of the clearance in the conveyance direction of the recording material P.

A compression spring (not illustrated) is provided between the flange 311-2R and the support member 310R and between the flange 311-2L and the support member 310L, and each of the flanges 311-2R and 311-2L is pressed toward a middle side of the film 306 in the longitudinal direction, whereby each of the flanges 311-2R and 311-2L butts against an end portion of the film 306, and the positions of the flanges 311-2R and 311-2L can be stabilized. With this configuration, for example, the position of each of the flanges 311-2R and 311-2L in the conveyance direction of the recording material P is intentionally shifted, whereby it is possible to simultaneously implement adjustment of alignment and separation of the film 306 and the heater 309 from each other when the sheet supply is not performed.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2023-122712, which was filed on Jul. 27, 2023 and which is hereby incorporated by reference herein in its entirety.

What is claimed is:

1. A fixing device configured to fix a toner image to a recording material, the fixing device comprising:

a film having a tubular shape;

a nip portion forming member disposed in an inner space of the film and in contact with an internal surface of the film along a longitudinal direction of the film, wherein a length of the nip portion forming member in the longitudinal direction is longer than a length of the film in the longitudinal direction and both ends of the nip portion forming member are projected outward from the inner space of the film;

a roller that is in contact with an outer circumferential surface of the film and that forms a nip portion together with the nip portion forming member via the film; and two guide members configured to guide rotation of the film, wherein each of the two guide members is disposed to face an internal surface of the film in an end portion area in the longitudinal direction, wherein the fixing device is configured to use the nip portion to fix the toner image to the recording material on which the toner image has been formed while nipping and conveying the recording material, wherein the fixing device further comprises a restriction unit configured to restrict movement of the two guide members in a first direction that is perpendicular to the longitudinal direction and that is away from the roller, wherein the nip portion forming member is provided to be movable in the first direction, and wherein, when the nip portion forming member moves from a first position at time of fixing the toner image to a second position that is shifted from the first position in the first direction, the restriction unit is configured to restrict movement of the two guide members in the first direction to change a relative position in the first direction between the inner surface of the film and an area of the nip portion forming member, the area facing the inner surface.

2. The fixing device according to claim 1, further comprising a frame configured to hold the roller and the two guide members, wherein the restriction unit is configured to fix the two guide members to the frame to restrict the movement of the two guide members.

3. The fixing device according to claim 1, wherein the nip portion forming member is a heater.

4. A fixing device configured to fix a toner image to a recording material, the fixing device comprising:

a film having a tubular shape;

a nip portion forming member disposed in an inner space of the film and in contact with an internal surface of the film along a longitudinal direction of the film, wherein a length of the nip portion forming member in the longitudinal direction is longer than a length of the film in the longitudinal direction and both ends of the nip portion forming member are projected outward from the inner space of the film;

a roller that is in contact with an outer circumferential surface of the film and that forms a nip portion together with the nip portion forming member via the film; and two guide members configured to guide rotation of the film, wherein each of the two guide members is disposed to face an internal surface of the film in an end portion area in the longitudinal direction, wherein the fixing device is configured to use the nip portion to fix the toner image to the recording material on which the toner image has been formed while nipping and conveying the recording material, wherein the fixing device further comprises a restriction unit configured to restrict movement of the two guide members in a first direction that is perpendicular to the longitudinal direction and that is away from the roller, and wherein, by restricting the movement of the two guide members, a clearance between the internal surface of the film in the end portion area and the nip forming member when the nip portion forming member is positioned at the second position is larger than a clearance between the internal surface of the film in the end portion area and the nip portion forming member when the nip portion forming member is positioned at the first position.

5. The fixing device according to claim 4, wherein the nip portion forming member is a heater.

6. A fixing device configured to fix a toner image to a recording material, the fixing device comprising:

a tubular film;

a nip portion forming member disposed in an inner space of the film and in contact with an internal surface of the film along a longitudinal direction of the film, wherein both ends of the nip portion forming member in the longitudinal direction project outward from the inner space of the film;

a roller that is in contact with an outer circumferential surface of the film and forms a nip portion together with the nip portion forming member via the film;

two guide members configured to guide rotation of the film, wherein each of the two guide members is disposed to face an internal surface of the film in an end portion area in the longitudinal direction; and a frame configured to hold the roller and the two guide members, wherein the fixing device is configured to use the nip portion to fix the toner image to the recording material on which the toner image has been formed while nipping and conveying the recording material, wherein the nip portion forming member is movable between a first position and a second position and is farther away from an axis of the roller at the second position than at the first position, wherein the two guide members are fixed to the frame, and wherein a clearance between the internal surface of the film in the end portion area and the nip forming member when the nip portion forming member is positioned at the second position is larger than a clearance between the internal surface of the film in the end portion area and the nip forming member when the nip portion forming member is positioned at the first position.

7. The fixing device according to claim 6, wherein the nip portion forming member is a heater.

* * * * *